(12) United States Patent
Cash et al.

(10) Patent No.: US 8,945,423 B2
(45) Date of Patent: Feb. 3, 2015

(54) REDUCED FOSSIL FUEL IN AN OXIDIZER DOWNSTREAM OF A BIOMASS FURNACE

(75) Inventors: James T. Cash, Hackettstown, NJ (US); Jeffrey C. Rudolph, Suamico, WI (US)

(73) Assignee: MegTec Systems, Inc., DePere, WI (US)

( * ) Notice: Subject to any disclaimer, the term of this patent is extended or adjusted under 35 U.S.C. 154(b) by 0 days.

(21) Appl. No.: 13/176,386

(22) Filed: Jul. 5, 2011

(65) Prior Publication Data

US 2012/0174431 A1 Jul. 12, 2012

Related U.S. Application Data

(60) Provisional application No. 61/362,084, filed on Jul. 7, 2010.

(51) Int. Cl.
| | | |
|---|---|---|
| *C01B 3/38* | (2006.01) | |
| *C07C 1/02* | (2006.01) | |
| *A62D 3/40* | (2007.01) | |
| *B01D 53/72* | (2006.01) | |
| *B01D 53/62* | (2006.01) | |

(52) U.S. Cl.
CPC ............. *B01D 53/72* (2013.01); *B01D 53/62* (2013.01); *B01D 2257/502* (2013.01); *B01D 2257/708* (2013.01); *B01D 2258/0283* (2013.01)
USPC ............................................ 252/373; 588/321

(58) Field of Classification Search
None
See application file for complete search history.

(56) References Cited

U.S. PATENT DOCUMENTS

| | | | |
|---|---|---|---|
| 4,233,024 A | 11/1980 | Plass | |
| 4,270,467 A | 6/1981 | Drake | |
| 4,299,561 A | 11/1981 | Stokes | |
| 4,378,208 A * | 3/1983 | Payne et al. | ....................... 432/14 |
| 4,646,712 A | 3/1987 | Ferguson et al. | |

(Continued)

FOREIGN PATENT DOCUMENTS

WO 2006/119631 A1 11/2006

OTHER PUBLICATIONS

Harris Group Inc. paper, "Biomass for Steam and Power", 2009, pp. 1-19, Iwanick.

(Continued)

*Primary Examiner* — Melvin C Mayes
*Assistant Examiner* — Michael Forrest
(74) *Attorney, Agent, or Firm* — Nields, Lemack & Frame, LLC

(57) ABSTRACT

Method of extracting syngas between the zone in a furnace where oxygen-starved combustion of biomass occurs and the zone in the furnace where secondary air is added to complete combustion, conditioning and cleaning the extracted syngas, and delivering it in a metered amount to the oxidizer or upstream of the oxidizer to reduce or eliminate the need for additional fossil fuels once the oxidizer has achieved its operating temperature. The gasifier or furnace burns solid waste and produces a syngas containing relatively high levels of CO, which is extracted from the furnace, conditioned, and introduced into an RTO as a fuel source. In certain embodiments, no extraction of syngas from the furnace takes place; the furnace conditions are manipulated so that normally undesirable levels of CO and other VOC's remain in the process stream. The heat from the furnace is used as intended (e.g., to heat a dryer), the stream is conditioned, and ultimately proceeds to a downstream RTO. Since the gas stream remains rich in CO and VOC's, its fuel value in the RTO is substantially higher than otherwise would be the case.

16 Claims, 4 Drawing Sheets

(56) References Cited

U.S. PATENT DOCUMENTS

| | | | |
|---|---|---|---|
| 4,779,548 | A | 10/1988 | Mueller et al. |
| 5,365,863 | A | 11/1994 | D'Souza |
| 5,531,593 | A | 7/1996 | Klobucar |
| 5,730,945 | A | 3/1998 | Klobucar |
| 5,891,411 | A | 4/1999 | Gribbon |
| 5,989,465 | A | 11/1999 | Safstrom et al. |
| 6,042,795 | A | 3/2000 | Chen et al. |
| 6,051,199 | A | 4/2000 | Teller |
| 6,143,553 | A | 11/2000 | Teller |
| 6,228,329 | B1 | 5/2001 | Garvey |
| 6,393,727 | B1 | 5/2002 | Seelig et al. |
| 7,018,447 | B2 | 3/2006 | McAnespie |
| 7,160,358 | B2 | 1/2007 | Spink et al. |
| 7,297,182 | B2 | 11/2007 | Ray et al. |
| 8,237,006 | B2 | 8/2012 | Stone et al. |
| 2003/0047508 | A1* | 3/2003 | Boles et al. ............... 210/606 |
| 2004/0045272 | A1* | 3/2004 | Miyoshi et al. ............ 60/39.12 |
| 2009/0018222 | A1* | 1/2009 | Klepper et al. ............ 518/704 |
| 2009/0183430 | A1 | 7/2009 | Schubert et al. |
| 2009/0221866 | A1* | 9/2009 | Stone et al. ............... 588/321 |
| 2010/0000224 | A1* | 1/2010 | Cappello ..................... 60/780 |
| 2012/0269692 | A1 | 10/2012 | Stone et al. |

OTHER PUBLICATIONS

Tri-Mer Corporation, web article, 2010, http://www.tri-mer.com/hot-gas-filtration.html, pp. 1-7, "UltraTemp Captures Fine Particulate, Scrubs Acid Gases, Controls NOx".

Teaford Co., web article, 2009, http://www.teafordco.com/biomass-fired-furnaces.htm, 3 pages, "Biomass Fired Furnaces".

Bionomic Industries, Inc., web article, 2008, http://www.bionomicind.com/pages/product11.html, 3 pages, "Series 7000/8000 Gas Atomized Venturi Scrubber".

Teaford Co., Electrical Controls, Product Sheet, 2010, "Controls for Energy Systems", 1 page.

Babcock & Wilcox Power Generation Group, Technical Paper, BR-1832, pp. 1-7, Dec. 2009, "Use of Numerical Modeling for Designing a Biomass-fired BFB Boiler Air System for Low NOx Emissions", Desam, et al.

International Search Report and Written Opinion mailed Nov. 14, 2011 in corresponding PCT application No. PCT/US11/42951.

Durr Systems, Inc., Synthetic Fuel Substitutes for Thermal Oxidizers/Increased Sustainability, Reduced Natural Gas Consumption, Oct. 31, 2007, pp. 1-17, BLOCKI.

German communication, with English translation, dated Apr. 3, 2014 in corresponding German patent application No. 11 2011 102 289.1.

* cited by examiner

US 8,945,423 B2

REDUCED FOSSIL FUEL IN AN OXIDIZER DOWNSTREAM OF A BIOMASS FURNACE

This application claims priority of U.S. Provisional Application Ser. No. 61/362,084 filed Jul. 7, 2010, the disclosure of which is hereby incorporated by reference.

FIELD

The embodiments disclosed herein are directed generally to processes that utilize a biomass burner (referred to as a furnace) and operate an oxidizer. More particularly, the embodiments are aimed at reducing fossil fuels consumed in the oxidizer typically used to clean gases generated from a process by utilizing or extracting combustible gases from the furnace and introducing them to the oxidizer. The gases preferably are conditioned prior to their introduction into the oxidizer, making them more practical for use in supplementing the oxidizer energy requirements.

BACKGROUND

Thermal oxidizers, and in particular, regenerative thermal oxidizers, have been used downstream of drying systems to remove Volatile Organic Compounds (VOC's) and carbon monoxide (CO) emissions. These drying systems may be drying any of a myriad of materials, such as green wood, wood fiber, coffee beans, agricultural products and other materials to lower the moisture content of the raw material so it can be turned into a final product. Furthermore, these drying systems often use a biomass fuel furnace to provide heat to the dryer. The abatement system often utilized to meet stringent air quality standards typically includes a device or devices to remove particulate and a device to remove gaseous organic compounds. For example, particulate removal can be accomplished via cyclones, baghouses, scrubbers and more typically dry or wet electrostatic precipitators. These particulate devices may operate by themselves, but when VOC, CO and other gaseous organic compounds must be removed, they are utilized as a pre-filter for an oxidizer. Additional manufacturing steps such as in the pressing process also release VOC's that can be treated in additional oxidizers. The most common type of oxidizer is a regenerative thermal oxidizer (known as an RTO) which can have up to about 98 percent energy recovery of the oxidized gas. Oxidizers have been employed to abate volatile organic compounds (VOC's) from industrial processes and this practice is well known.

In some industries, the amount of VOC's exhausted contain a high enough caloric value to equal the thermal energy requirement of the oxidizer, so once operating temperature is achieved by the oxidizer burner, the oxidizer burner turns off or goes to low fire with the balance of the energy necessary for combustion coming from the combustion of the VOC's in the process gas. This is typically not the case in other industries such as panel board manufacturing. As a result, since the mid 1990's, companies have searched for alternate ways to operate the oxidizer other than by consuming fossil fuels (such as natural gas or propane). One such proposal is to build a biomass gasifier and fire the oxidizer burner with the "producer" or "syngas", as it is referred to, in the RTO burner (hereinafter "syngas"). This idea has been impractical for several reasons. The typical syngas has a much lower heating value then natural gas, typically one tenth thereof, and therefore does not operate in a conventional burner very well. The heating value of the gas also varies over time. For this reason, the large volume of syngas, if injected directly into the burner chamber, would affect the mass balance of the oxidizer, resulting in a drop of thermal efficiency. The most important reason that this idea has been impractical is that a stand-alone biomass gasifier fitted with the required equipment to condition the syngas prior to delivery to the oxidizer is very expensive and has a very long return on investment.

Continuous efforts have been undertaken by the present inventors to devise a more practical and economical way to supplement or replace the fossil fuel used in an oxidizer. It was observed that many of these types of manufacturing facilities, when constructed new in recent years, were installing biomass furnaces to heat the dryers and hot oil systems. These furnaces were replacing older technology such as suspension burners that require the use of dry and fine small particles of wood to create a fire for heating. Instead, these furnaces can combust wet (typically 25% to 50% moisture) scrap material such as bark, pine needles and hogged stumps. Many older facilities have retrofitted this type of furnace to lower the cost of the biomass (scrap) that is used to heat the process. It was further observed that these furnaces typically have a two step combustion process. Step one involves a pile or mound of the material burning at the bottom of the furnace with minimal combustion air added from the side or below the pile. This slow combustion and minimal air causes a low temperature and a reduced (low oxygen) environment around the fuel. The gas coming off has similar properties including caloric value to those produced in gasifier systems. This gas then travels a distance within the furnace until secondary air is added in step 2, completing combustion and producing high grade heat for the drying process.

It would be desirable to provide a process of effectively and efficiently using the syngas produced in a gasifier to operate a downstream RTO, such as by maintaining the RTO at operating temperature while minimizing or eliminating the use of fossil fuel.

SUMMARY

The embodiments disclosed herein include a method of successfully extracting syngas between the zone in the furnace where the oxygen-starved combustion of biomass occurs and the zone in the furnace where secondary air is added to complete combustion, conditioning and cleaning the extracted syngas, and delivering it in a metered amount to the oxidizer or upstream of the oxidizer to reduce or eliminate the need for additional fossil fuels once the oxidizer has achieved its operating temperature. The conditioning process allows for transport of the extracted syngas across a manufacturing facility so that it may be used to operate even remote oxidizers or perhaps other devices that typically use fossil fuels.

If a manufacturing facility has a biomass gasifier, the conditioning methods presented herein can be utilized to make transportation of the fuel gas and utilization for the oxidizer practical. Existing subsystems within these facilities can be further utilized to reduce the costs of the gas conditioning system. Accordingly, in certain embodiments, the gasifier or furnace burns solid waste and produces a syngas. The syngas, containing relatively high levels of CO, is extracted from the furnace, conditioned, and introduced into a regenerative thermal oxidizer as a fuel source for the oxidizer, which combusts polluted process gas and vents the clean (e.g., 98-99% clean) gas to atmosphere.

In certain embodiments, no extraction of syngas from the furnace takes place. Instead, the furnace conditions are appropriately manipulated so that normally undesirable levels of CO and other VOC's remain in the process stream. The heat from the furnace is used as intended (e.g., to heat a dryer), the stream is conditioned, and ultimately proceeds to a downstream RTO. Since the gas stream remains rich in CO and VOC's, its fuel value in the RTO is substantially higher than otherwise would be the case were the biomass furnace not so manipulated.

DETAILED DESCRIPTION

The embodiments disclosed herein relate to methods of reducing or eliminating the need for auxiliary fuel in the oxidizer (referred to as the RTO) in a manufacturing facility that includes a biomass furnace or gasifier and a dryer. The furnace can be operated A) so excessive CO and VOC's are released from the furnace, conditioned by the particulate removal devices, and are directed to the combustion chamber of an oxidizer where these gases are combusted to form $CO_2$ and $H_2O$ while providing some or all of the energy to sustain the oxidizer operation, or B) so syngas formed within the furnace can be extracted, conditioned and delivered to the oxidizer where these gases are combusted to form $CO_2$ and $H_2O$ while providing some or all of the energy to sustain the oxidizer operation. A method of conditioning the gas is also disclosed, which enables the transporting and utilizing of this gas as energy for use in the oxidizer system.

Figure 1:
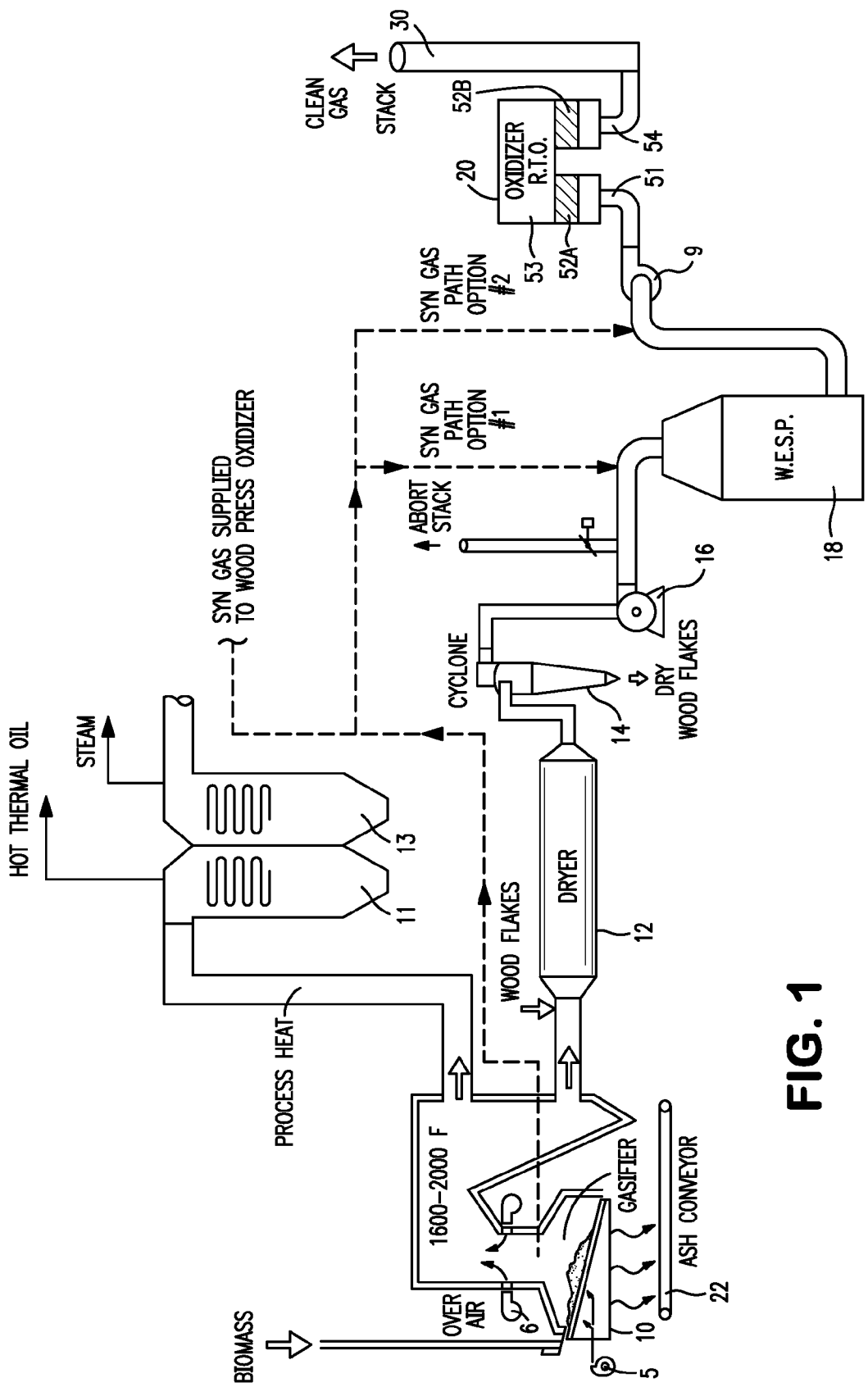
FIG. 1 is a schematic diagram of a manufacturing facility in including a furnace and a regenerative thermal oxidizer in accordance with certain embodiments.

Even with the high thermal efficiency of the RTO, the large air volumes exhausted from typical manufacturing facility dryers (typically 50,000 to 500,000 cubic feet per minute) and very low VOC concentration (low caloric value), require substantial amounts of fossil fuel (typically natural gas or propane) to operate the oxidizer, and therefore result in on-going operating costs to the owner. Some of these facilities also have additional oxidizers to treat volatile organic compounds (VOC) as is the case with a wood press used to make wood panels such as oriented strand board, particle board or medium density board. These oxidizers also would benefit from supplemental energy transported from the biomass furnace as shown in FIG. 1.

Syngas formed within the furnace (bio gas) will typically have low oxygen levels due to formation in a reduced atmosphere within the furnace. Accordingly, in accordance with certain embodiments, the biogas is blended with the much larger volume of the process gas prior to entering the oxidizer and therefore has sufficient oxygen to combust in the oxidizer (RIO).

In accordance with certain embodiments, the reduction of fossil fuel use in the oxidizer is accomplished by controlling the operation of the furnace so excessive CO and VOC's are released from the furnace. This can be achieved by manipulating biomass fuel feed rate, moisture and over-fire or secondary combustion air. Another method is to block one port in the over-fire or secondary combustion air to purposely create a zone in the furnace that does not complete combustion and therefore allows some of the syngas/producer gas to travel through the furnace and likely a higher amount of CO than typically would be desirable as well. Another method is to use a lance to inject water in a section of the furnace. The resulting water vapor will suppress combustion similar to blocking a portion of the combustion air. This method requires additional equipment but may provide a wider range of control. Allowing products of incomplete combustion to pass through the furnace achieves a higher caloric value of the gas stream ultimately being treated by the oxidizer. Higher caloric value in the furnace exhaust can be achieved by manipulating the control of the fuel feed, under fire air feed and over air feed to produce high CO levels and other products of partial combustion out of the furnace. This embodiment is the simplest method in that minimal changes to existing facilities are required, or the need for additional equipment in existing facilities is not necessary. However, this method is somewhat limited in that it will only reduce the fossil fuel requirement of oxidizer(s) directly downstream of the furnace and does not provide transport of energy to other oxidizers within the facility that are not in fluid communication with the furnace. Another limitation is it may prove difficult to control the fuel value as it relates to more then one downstream oxidizer, i.e., it cannot change the fuel value independently to two or more oxidizers that are treating the process gas. The higher caloric value of the furnace exhaust is subject to conditioning by the existing particulate removal devices (typically a scrubber or electrostatic precipitator, e.g., FIG. 4) upstream of the oxidizer as the process gas and thus further results in clean fuel gas with minimal equipment required. By reducing the amount of secondary combustion air, and therefore oxygen in the second step of the combustion process, excess CO will be produced as a byproduct of incomplete combustion. This is typically in opposition to the goal of the furnace operator or supplier in that CO is typically considered a pollutant to be avoided. It would be undesirable to vent high concentrations of CO to the atmosphere if it were not for the position of the oxidizer between the source of CO and the exhaust stack, downstream of the oxidizer. The high temperatures within the oxidizer complete the conversion of CO into $CO_2$ and in the process benefit from the exothermic reaction, lowering the requirement for fossil fuel.

In accordance with certain embodiments, a second method provides more reliable control of syngas and can be used to supplement energy to oxidizers located more remote from the furnace, particularly oxidizers that are not in fluid communication with the process stream. Syngas formed within the furnace is extracted, conditioned and delivered to the oxidizer to which these gases are combusted to form $CO_2$ and $H_2O$ while providing some or all of the energy to sustain the oxidizer operation. This method does not require a change furnace operation or balance to ensure incomplete combustion as does the first embodiment, as it merely extracts a relatively small portion (e.g., 5-6%) of the syngas before that small portion has been completely combusted. Furthermore the extracted gas can be divided after the conditioning process and can be both supplied to multiple oxidizers or process equipment and the gas rate can be controlled for the fuel needs of each system independently, as shown in FIG. 1.

Figure 2:
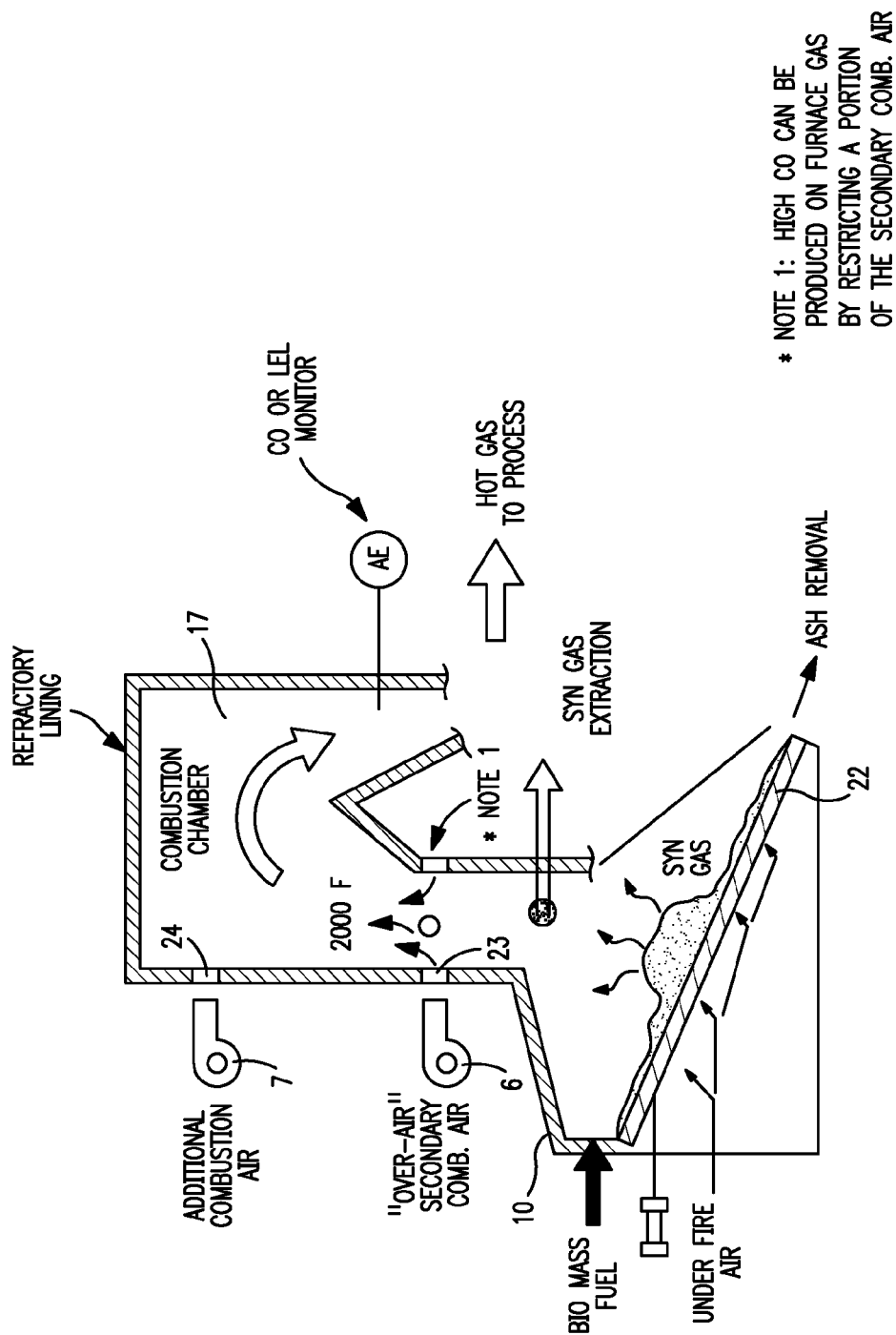
FIG. 2 is a cross-sectional view of the syngas extraction point within the furnace of FIG. 1.

Turning now to FIG. 1, there is shown schematically a manufacturing facility, such as a facility that produces wood panels. Those skilled in the art will appreciate that the product being manufactured is not particularly limited; the common factor being that the production thereof results in a source of polluted air that includes VOC's that require destruction prior to venting to atmosphere. In the embodiment shown, the facility includes a furnace or gasifier 10, a dryer 12, a particulate removal device 14, fan 16, a second particulate removal device 18, and an oxidizer 20. Those skilled in the art will appreciate that the scheme shown is for illustrative purposes only; not all components are necessarily essential to the various embodiments disclosed herein. Biomass is introduced into the furnace or gasifier 10 by any suitable means. Any suitable gasifier can be used, such as a walking or reciprocating grate furnace shown in greater detail in FIG. 2, to which under fire air is supplied such as with fan 5, and over-air is supplied such as with fan 6, and an associated ash removal device 22 such as a conveyer is provided. Heat from the gasifier 10 (combustion chamber temperatures in the range of about 1600-2000° F. are achieved) can be directed to a thermal oil heater 11 or a steam boiler 13 for steam turbines and generators to produce electricity as shown. As seen in FIG. 2, a typical furnace or gasifier 10 includes a lower gasification chamber and an upper combustion chamber 17, which allows for low emissions with good control of the combustion process. The furnace or gasifier 10 has means (typically at a plurality of locations within the furnace) for the introduction of secondary combustion air or "over-air" at 23, and additional combustion air at 24 such as with fan 7. High CO can be produced on furnace gas by restricting a portion of the secondary combustion air. This can be a fixed percentage of the furnace chamber such as blocking 5 percent of total secondary air or can be actively controlled by monitoring CO and O2 at the furnace discharge and adjusting the introduction of secondary air accordingly, such as by controlling fan 6.

The hot gas product of the gasifier can be used to dry products such as wood flakes and the like in a dryer 12 where they are dried in a conventional manner. The separated gases are introduced into a particulate removal device 14 such as a cyclone, from which particulates are extracted from the bottom, and the gas stream exits the top of the cyclone. The separated gas leaving the cyclone can be further cleaned in a second particulate removal device 18, such as a wet electrostatic precipitator 18 (FIGS. 1 and 4), following which it is sent to a regenerative thermal oxidizer 20 such as with fan or pump 9. The oxidizer incinerates volatile organic components, and exhausts clean gas to atmosphere via exhaust stack 30. Because CO and/or VOC's were intentionally left in the gas existing the furnace 10, the gas entering the RTO has a high energy value sufficient to maintain operation of the RTO at optimal temperature without the introduction of auxiliary fuel such as natural gas.

Figure 3:
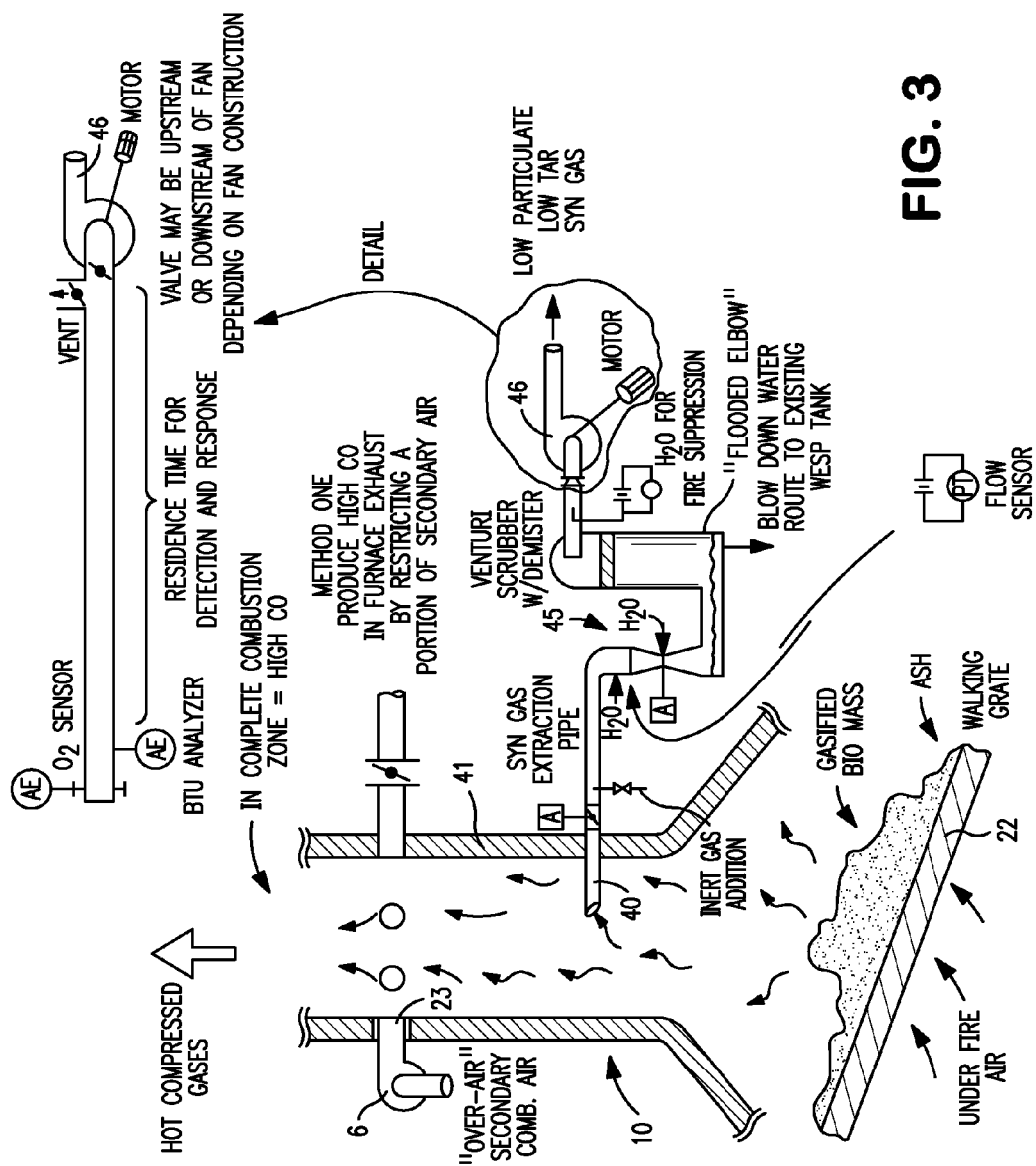
FIG. 3 is a cross-section view of a venturi scrubber than can be used to condition the syngas extracted from the gasifier in accordance with certain embodiments.

In accordance with an alternative embodiment, syngas produced in the gasifier is extracted, preferably at a location upstream of the combustion chamber 17. As seen in FIG. 3, this can be accomplished with a syngas extraction pipe 40 or the like, which penetrates a wall 41 of the furnace 10. The extracted syngas is preferably conditioned (e.g., syngas path option #1 shown in FIG. 1), and then introduced into the regenerative thermal oxidizer 20, such as into the inlet 51 of one of the heat exchange beds of the oxidizer 20, or into the combustion zone 53 of the oxidizer 20. Since the syngas is extracted from the furnace 10 prior to complete combustion, it is laden with CO and VOC's and thus has a relatively high energy value. It is thus suitable for use in an RTO (e.g., an inline, downstream RTO, and/or an RTO at the facility that is not inline) as a fuel for oxidation of process gas VOC's.

To achieve high particulate removal with the syngas, especially of the fly ash contained within the syngas, a high pressure drop venturi scrubber 45, a high temperature baghouse or a precipitator 18 is preferably used. Normally a high pressure drop venturi scrubber is not desirable for fine particulate removal for large gas streams as this leads to very high electrical demand by the blower, but where the volume is small this is not a concern. If the flue gas is maintained above 500° F., a dry electrostatic precipitator can be used, but this may be impractical for transporting the syngas any distance over 50 feet because cooling of the ductwork will cause dropout of the heavy organics unless the entire pipe work is heat traced and insulated. While dry filtration is contemplated in one embodiment, the lower installed cost at of the wet scrubber (FIG. 3) is preferred, particularly in view of its ability to prevent fires or spread of fires from the furnace to the process ductwork. As shown in FIG. 3, the continuous supply of water as well as the high velocity in the venturi section both provide efficient flame barriers. The speed in the venturi is typically 100 to 250 mph, well over flame propagation speed. To further enhance the removal efficiency of heavy organics, the make-up water to the scrubber can be cooled through a heat exchanger (not shown), thus leading to further reduction of heavy organics through condensation. A high pressure wet scrubber does not have filters or other media to replace and has few moving parts. Water remaining in the venture scrubber can be routed to the wet electrostatic precipitator 18 for use therein. A variable throat venturi is preferred as it maintains removal efficiency over a wider range of flows. Both the demand for supplemental energy by the oxidizer, and the caloric value of the syngas will vary over time so it is important to build a system that can deliver a variable amount of syngas to the oxidizer.

Often these facilities have existing water treatment systems as is the case for an RTO with a wet electrostatic precipitator (WESP) upstream. Capital and operating costs can be reduced by treating the discharge water from the syngas scrubber 45 by piping it to the water treatment system for the process gas prefilter. Such systems typically contain a rotating screen or centrifuge for removing solids from the water. Utilizing existing water storage tanks and water treatment will save substantial cost. If a facility has a biomass gasifier the conditioning methods presented within can be utilized to make transportation of the fuel gas and utilization for the oxidizer practical.

The cleaned syngas can be introduced into the inlet 51 of the RTO 20, or directly into the RTO combustion chamber. Such oxidizers typically require high oxidation temperatures in order to achieve high VOC destruction. To achieve high heat recovery efficiency, the "dirty" process gas which is to be treated is preheated before oxidation. A heat exchanger column 52A is typically provided to preheat these gases. The column is usually packed with a heat exchange material having good thermal and mechanical stability and sufficient thermal mass. In operation, the process gas is fed through a previously heated heat exchanger column, which, in turn, heats the process gas to a temperature approaching or attaining its VOC oxidation temperature. This pre-heated process gas is then directed into a combustion zone 53 where any incomplete VOC oxidation is usually completed. The treated now "clean" gas is then directed out of the combustion zone 53 and back through the heat exchanger column, or through a second heat exchange column 52B. As the hot oxidized gas continues through this column, the gas transfers its heat to the heat exchange media in that column, cooling the gas and pre-heating the heat exchange media so that another batch of process gas may be preheated prior to the oxidation treatment. Usually, a regenerative thermal oxidizer has at least two heat exchanger columns 52A, 52B which alternately receive process and treated gases. This process is continuously carried out via the switch of suitable valving, allowing a large volume of process gas to be efficiently treated. Cleaned gas exiting the outlet 54 of the second column 52B is exhausted via stack 30.

Example 1

A process gas flow of 100,000 wet standard cubic feet per minute (wscfm) with an inlet temperature of 160° F. containing 100 pounds per hour of VOC is being treated by a nominal 95% thermally efficient RTO. The higher heating value (HHV) of the VOC is 14,000 btu/lb. This system will require approximately 9,500,000 btu per hour of additional energy. The gasses extracted from the furnace between the two steps of combustion will typically have a heating value of 80 to 100 btu per standard cubic foot. Therefore, to fully supplement the fossil fuel to the RTO, a gas volume of 1500 to 2000 standard cubic feet must be extracted, purified and transported to the RTO inlet. The gas in this part of the furnace is typically 400 to 800° F. and contains fly ash (particulate) nitrogen, carbon monoxide (CO) hydrogen ($H_2$) water vapor, methane ($CH_4$), water vapor ($H_2O$) and various high molecular weight organics such as turpene. This poses a problem to transfer in traditional piping due to the tendency for particulate and heavy organics to plate out in the pipe work and valves and is not a clean fuel for the RTO, which leads to equipment fouling. The volume of gas is relatively small (2000 scfm fuel gas compared with 100,000 scfm process gas being treated by the oxidizer); therefore a high pressure drop scrubber, which is relatively small in size, is positioned close or adjacent to the furnace connection. The syngas immediately passes through the scrubber to remove harmful particulate, heavy condensable and other elements not desirable in a fuel gas. A dedicated blower 46 of approximately 30 to 50 inches water column pressure is used to draw the syngas from the furnace and through the scrubber, as well as to provide the pressure to transport the fuel gas to the RTO. The rate of syngas withdrawal from the furnace is preferably measured or monitored as part of the safety system for the fuel train and the pressure drop of all or part of the scrubber can be used for this. Placing the blower 46 downstream of the scrubber 45 saves on operating costs as brake horsepower is reduced by handling the cooler scrubber discharge then the hotter furnace gas. If additional pressure is required, two blowers can be used in series. Flow control can be achieved by modulating the fan blower speed or with modulating dampers.

A further requirement of the syngas system is to design the system to either ensure that the gas remains outside of the flammable range (by eliminating the presence of an oxidant) or by designing the system to safely handle and transport a potentially flammable gas. The reason for this requirement is that although the syngas being extracted from the furnace is expected to be low in oxygen, it is difficult to ensure that this is the case. In the standard furnace operation this is not an issue because the combustion is quickly completed in the secondary combustion zone of the furnace. However, because the combustion reactions can be quenched in the scrubber while the gas remains in the flammable range, this is not necessarily true in the syn-gas extraction system. While the gases remain in the presence of water in the scrubber the system is protected by the extinguishing effect of the water. However, once the water is removed, the potential of the gas to be ignited in the presence of a source of ignition must be considered.

There are four methods that can be used to safely design the system for this hazard.

The first and preferred method of minimizing the potential for a deflagration or detonation is by maintaining liquid water in the system at all points. Liquid water will prevent or immediately extinguish any spark provided that it is present in the immediate vicinity of the ignition source. This method is preferred because of the relatively low cost of maintaining liquid in contact with the gas and because the small volume of liquid would not be an operational concern to the remainder of the system. In order to ensure that water is present at all times, flow sensors can be added on any water addition device whose failure would allow part of the system to lose water suppression. Additionally this method would not be viable with any of the embodiments using a dry method of particulate control (e.g. high temperature baghouse or dry electrostatic precipitator).

The second method is to design the system to contain, suppress, or vent any potential fire or explosion. These are the three safety methods prescribed in the recommendations of the NFPA, if the conditions to prevent the event from occurring cannot be met.

This method is less desirable because of the difficulty and expense involved in certifying that the system is safely designed. In addition, such a system would require deflagration or detonation arrestors which are prone to plugging.

The third method is to continuously analyze the gas for oxygen to ensure that the level is lower than that required to start a deflagration. If this path is followed the reliability and speed of the analysis must be considered.

While engineering the system to provide a reliable oxygen reading is readily achievable, it will likely require gas conditioning in any sampling method which increases the response time of the analyzer. Alternatively, a laser type oxygen measurement could be used to obtain a direct measurement, but at a substantial addition cost. Standard zirconia type sensors are not viable due to the high temperature of the sensor being a potential ignition source which cannot only potentially ignite the explosion that is desired to be prevented, it will also likely provide a falsely low $O_2$ reading due to the consumption of $O_2$ by the fuel present at the high temperatures of the sensor.

Response time of the $O_2$ sensor is critical in that all components downstream of the $O_2$ sensor that the gas could reach before a high oxygen level, in the range of 5-7% is detected and diverted, must be protected by containment, suppression or venting systems.

Because of the high particulate content of the furnace gas, oxygen sensing downstream of the gas cleaning device (i.e. venturi scrubber, Dry ESP, Wet ESP, etc.)is preferred.

If the method is chosen, an inert gas would be required for purging the system of oxygen prior to allowing syngas into the system. The inert gas could also be used to control the $O_2$ content as necessary.

This method is less desirable because in addition to the cost of the oxygen sensing and diverting system it would not allow the system to operate if substantial oxygen is present and it may be desirable to continue the system operation in this condition.

The fourth method is control the biomass furnace such that the $O_2$ level cannot become high enough for the gas to be explosive. This method is less desirable because the widely varying conditions in the furnace will make it very difficult to consistently control the gas conditions at the point where syngas is removed.

Additionally to safely add Syngas to the oxidizer as a fuel source upstream of the RTO it must be shown that the combined LEL of the syngas and the process gas can be controlled so that under all operating conditions the Lower Explosive Limit (LEL) of the combined streams will be under 25% as required by government regulations (e.g., NFPA 86).

There are three methods of accomplishing this. The first and preferred method is to control syngas injection so that the combined stream cannot exceed 25% LEL under any operating condition. To accomplish this the following four variables must be measured or calculated:

The minimum flow of process gas ($F_p$) in SCFM
The maximum LEL of the process gas ($LEL_p$)
The maximum flow of syngas ($F_s$) in SCFM
The maximum LEL of the syngas ($LEL_s$)

The maximum LEL of the combined stream is defined by the equation:

$$LEL_{max}=(F_p LEL_p + F_s LEL_s)/(F_p + F_s)$$

Figure 4:
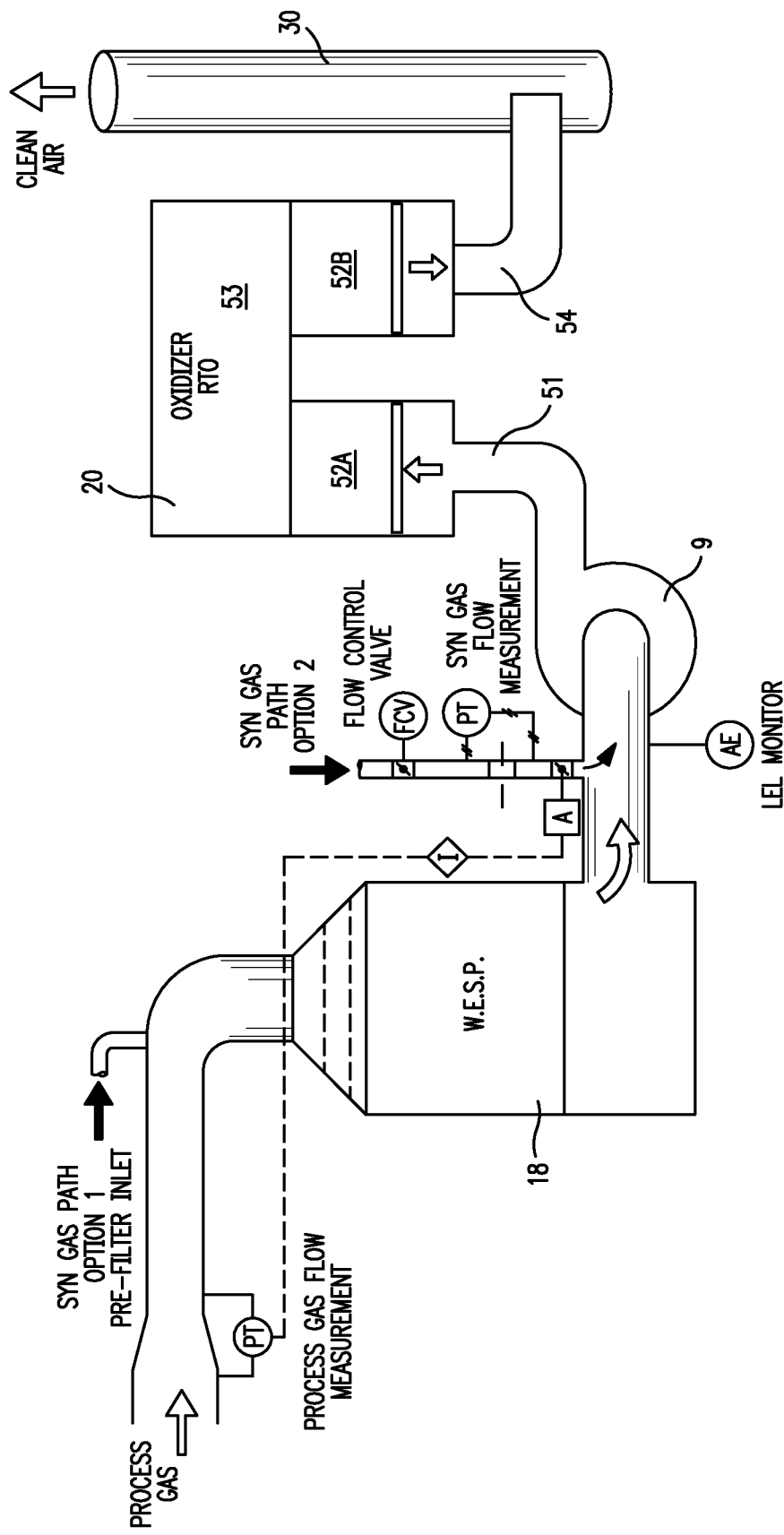
FIG. 4 is a schematic diagram of a particle separator shown upstream of a regenerative thermal oxidizer in accordance with certain embodiments.

For those skilled in the art, the maximum LEL of each stream can be calculated based on process data and historical information on these processes. The flow of process gas must be measured and instrumented to provide a reliable signal should the process gas flow fall below this minimum flow. Similarly, the flow of syngas must be measured and instrumented to provide a reliable signal should the syngas flow exceed this maximum flow. Either of these signals can be used to shut down the syngas injection system to prevent a process gas concentration exceeding 25% LEL from entering the oxidizer. Flow measuring devices must be selected to work in saturated streams and particulate laden environments (FIG. 4).

The second method is measure the Energy content of the syngas with a BTU analyzer (FIG. 3) and use this analyzer to adjust the maximum amount of syngas flow allowed. This method is less desirable due to the particulate load and saturated nature of the stream, which could likely require conditioning the sample before the analyzer, causing a long response time and the need for additional safety devices to allow for multiple maximum syngas flow settings.

The third method is to monitor the LEL of the gas stream, such as by sensing the LEL with an LEL monitor, to ensure it stays below 25% in all cases.

This method is less desirable because it requires that the system be able to vent the gases or otherwise prevent them from entering the oxidizer if 25% LEL is reached. This requires the response time of the sensor and the control system to be considered to ensure that the process gas can be prevented from entering the oxidizer, or other ignition source, in time. Furthermore, the particulate load and saturated nature of the stream could likely require conditioning the sample before the analyzer, thereby increasing the response time.

In the embodiment where the furnace control is manipulated to produce a higher CO and VOC concentrations exiting the furnace, an LEL or CO monitor would likely be required (FIG. 2) to ensure that concentration of gas exiting the furnace does not exceed 25% LEL. These analyzers would have similar sample conditioning issues to those mentioned above.

Having now describing the invention in detail, those skilled in the art will recognize modifications and substitutions to the embodiments identified in the specification which can be used to meet specific operational requirements. Such modifications and substitutions are intended to be within the scope of the invention as defined by the following claims.

What is claimed is:

1. A method of maintaining a regenerative thermal oxidizer at operating temperature while minimizing the use of fossil fuel in said oxidizer, comprising providing a biomass furnace to produce a hot gas to provide thermal energy to a downstream process; combusting biomass in said furnace in a first stage wherein the combustion is in an oxygen-starved environment and in a second stage wherein the combustion is in an environment with an amount of oxygen greater than in said oxygen-starved environment; extracting a portion of the gas prior to the complete combustion of said gas; conditioning said extracted gas to remove particulate matter therefrom; and introducing said conditioned gas to said regenerative thermal oxidizer.

2. The method of claim 1, wherein said gas is conditioned with a wet or dry precipitator upstream of the oxidizer.

3. The method of claim 1 wherein said gas is conditioned with a wet scrubber.

4. The method of claim 1, further comprising introducing liquid water into said gas prior to said introduction of said conditioned gas to said regenerative thermal oxidizer to prevent deflagration or detonation from occurring.

5. The method of claim 1, further comprising providing deflagration or detonation suppression, containment or venting techniques.

6. The method claim 1, further comprising monitoring the oxygen concentration of said gas.

7. The method of claim 6, wherein the oxygen concentration of said gas introduced into said oxidizer is controlled by adding an inert gas to said gas.

8. The method of claim 1, wherein said gas is conditioned with a venturi scrubber.

9. The method of claim 8, wherein said venturi scrubber has an inlet, and wherein water is introduced to said venturi scrubber inlet to reduce the flammability of said gas therein.

10. The method of claim 1, further comprising controlling the maximum LEL of said gas entering said oxidizer by limiting the maximum gas flow and the minimum process gas flow.

11. The method of claim 1, further comprising controlling the maximum LEL of said gas entering said oxidizer by monitoring the energy of said gas with a BTU monitor.

12. The method of claim 1, further comprising controlling the maximum LEL of said gas entering said oxidizer by monitoring the lower explosion limit of said gas entering said oxidizer with an LEL monitor.

13. The method of claim 1, wherein at least a portion of the gases produced by said furnace, after providing energy to a downstream process, is directed to a regenerative thermal oxidizer for pollution control.

14. A method of maintaining a regenerative thermal oxidizer at operating temperature while minimizing the use of fossil fuel in said oxidizer, comprising burning biomass in a biomass furnace to produce heat for use in a downstream process; controlling the combustion of said biomass in said furnace such that an increased concentration of carbon monoxide and volatile organic components is emitted in exhaust of said furnace to provide a higher caloric value to said exhaust stream to be treated by said regenerative thermal oxidizer; conditioning said exhausted gas stream to remove particulate matter therefrom; and introducing said conditioned gas stream to said regenerative thermal oxidizer.

15. The method of claim 14, wherein the combustion is controlled by analyzing the CO content of said gas stream at the outlet of said biomass furnace.

16. The method of claim 14, wherein the combustion is controlled by sensing the LEL of said gas stream at the outlet of said biomass furnace.

* * * * *